US012739418B2

(12) United States Patent
Sim et al.

(10) Patent No.: US 12,739,418 B2
(45) Date of Patent: Sep. 15, 2026

(54) METHOD AND DEVICE FOR ENCODING AND DECODING IMAGE INVOLVING GRADUAL REFRESH TECHNIQUE

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Han Sol Choi, Dongducheon (KR); Jong Seok Lee, Seoul (KR); Sea Nae Park, Seoul (KR); Seung Wook Park, Yongin (KR); Wha Pyeong Lim, Hwaseong (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

(21) Appl. No.: 18/986,079

(22) Filed: Dec. 18, 2024

(65) Prior Publication Data

US 2025/0175637 A1 May 29, 2025

Related U.S. Application Data

(63) Continuation of application No. 18/203,903, filed on May 31, 2023, now Pat. No. 12,212,768, which is a (Continued)

(30) Foreign Application Priority Data

Mar. 12, 2019 (KR) ........................ 10-2019-0028371
Mar. 18, 2019 (KR) ........................ 10-2019-0030334
May 15, 2019 (KR) ........................ 10-2019-0056985

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/159* (2014.11);
(Continued)

(58) Field of Classification Search
CPC .... H04N 19/44; H04N 19/105; H04N 19/159; H04N 19/176; H04N 19/46; H04N 19/82;
(Continued)

(56) References Cited

U.S. PATENT DOCUMENTS 8,300,690 B2 10/2012 Hannuksela
9,294,777 B2 3/2016 Wang
(Continued)

FOREIGN PATENT DOCUMENTS

CN 103918258 A 7/2014
CN 104823449 A 8/2015
(Continued)

OTHER PUBLICATIONS

Wang, Y.K. et al., "On Random Access", Joint Video Team (JVT) of ISO/IEC MPEG & ITU-T VCEG (ISO/IEC JTC1/ SC29/WG11 and ITU-T SG16 Q.6), 4th Meeting: Klagenfurt, Austria (Jul. 22-26, 2002), 13 pages.
(Continued)

*Primary Examiner* — Francis Geroleo
(74) *Attorney, Agent, or Firm* — Fox Rothschild LLP

(57) ABSTRACT

A method is provided for decoding a sequence of pictures using a gradual refresh technique. In particular, all areas in one picture are gradually encoded or decoded over a plurality of pictures associated with the picture.

10 Claims, 16 Drawing Sheets

Related U.S. Application Data continuation of application No. 17/278,453, filed as application No. PCT/KR2020/003433 on Mar. 12, 2020, now Pat. No. 11,706,429.

(51) Int. Cl.
*H04N 19/159* (2014.01)
*H04N 19/176* (2014.01)
*H04N 19/46* (2014.01)
*H04N 19/82* (2014.01)

(52) U.S. Cl.
CPC .......... *H04N 19/176* (2014.11); *H04N 19/46* (2014.11); *H04N 19/82* (2014.11)

(58) Field of Classification Search
CPC .... H04N 19/11; H04N 19/117; H04N 19/119; H04N 19/433; H04N 19/124; H04N 19/13; H04N 19/42; H04N 19/80; H04N 19/132
See application file for complete search history.

(56) References Cited

U.S. PATENT DOCUMENTS 9,398,293 B2 7/2016 Wang et al.
2004/0076399 A1 4/2004 Arai et al.
2014/0092963 A1* 4/2014 Wang .................... H04N 19/50 375/240.12
2014/0185670 A1* 7/2014 Wang .................... H04N 19/50 375/240.12
2014/0192897 A1* 7/2014 Wang .................... H04N 19/70 375/240.25
2014/0321556 A1 10/2014 Xiao et al.
2015/0181233 A1 6/2015 Ramasubramonian et al.
2015/0373358 A1* 12/2015 Pang .................... H04N 19/105 375/240.12
2016/0165237 A1 6/2016 Chen et al.
2019/0289301 A1 9/2019 Lim et al.
2019/0373276 A1* 12/2019 Hu .................... H04N 19/172
2021/0360291 A1* 11/2021 Skupin .................... H04N 19/44
2021/0400285 A1* 12/2021 Chujoh .................... H04N 19/172
2021/0409691 A1* 12/2021 Hendry .................... H04N 19/174

FOREIGN PATENT DOCUMENTS

CN 109314790 A 2/2019
JP 2000-138900 A 5/2000
KR 20150065762 A 6/2015
KR 20150103111 A 9/2015
KR 20150105373 A 9/2015
RU 2635228 C2 11/2017
WO 2014051915 A1 4/2014
WO 2015095706 A1 6/2015

OTHER PUBLICATIONS

Kazui, K., "AHG14: Software for ultra low-latency encoding", Joint Video Experts Team (JVET) of ITU-T SG 16 WP 3 and ISO/IEC JTC 1/SC 29/WG 11, 13th Meeting: Marrackech, MA (Jan. 9-18, 2019) 7 pages.
First Examination Report for Indian Patent Application No. 202117046310 dated Jan. 30, 2023, from Intellectual Property India, 6 pages.
Russian Office Action for Russian Patent Application No. 2022122992 dated Mar. 6, 2023, with English translation, 8 pages.
Russian Office Action for Russian Patent Application No. 2022122994 dated Mar. 3, 2023, with English translation, 8 pages.
Russian Office Action for Russian Patent Application No. 2022122995 dated Mar. 3, 2023, with English translation, 9 pages.
Russian Office Action for Russian Patent Application No. 2022122996 dated Mar. 6, 2023, with English translation, 9 pages.
Chen et al. (Jan. 7-17, 2020) "AHG9: A Fix for GDR Signaling", Joint Video Exploration Team of ISO/IEC JTC1/SC29/WG11 and ITU-T SG.16, JVET-Q0414-v1, 3 pages.
Notification of First Office Action for Chinese Patent Application No. 2020800207778 from China National Intellectual Property Administration, dated Nov. 1, 2023, 6 pages, English translation.

* cited by examiner

Memory
Frame
Removed
Tile group/tile

Memory
Tile group/tile
Tile group/tile
Removed
Tile group/tile
Tile group/tile

METHOD AND DEVICE FOR ENCODING AND DECODING IMAGE INVOLVING GRADUAL REFRESH TECHNIQUE

CROSS-REFERENCE TO RELATED APPLICATION

This application is a Continuation Application of U.S. application Ser. No. 18/203,903 filed on May 31, 2023, application Ser. No. 18/203,903 is a Continuation Application of U.S. application Ser. No. 17/278,453 filed on Mar. 22, 2021, which is now U.S. Pat. No. 11,706,429 and issued on Jul. 18, 2023, application Ser. No. 17/278,453 is a 371 of International Patent Application No. PCT/KR2020/003433, filed Mar. 12, 2020, which claims priority to Patent Application No. 10-2019-0028371, filed on Mar. 12, 2019 in Korea, Patent Application No. 10-2019-0030334, filed on Mar. 18, 2019 in Korea, and Patent Application No. 10-2019-0056985, filed on May 15, 2019 in Korea, the entire contents of which are incorporated herein by reference.

TECHNICAL FIELD

The present disclosure relates to encoding and decoding of a video, and more particularly, to a method of gradually encoding or decoding an entire region within a picture over a plurality of pictures associated with the picture.

BACKGROUND

Since the volume of video data is greater than that of voice data or still image data, storing or transmitting video data without processing for compression requires a lot of hardware resources including memory. Accordingly, in storing or transmitting video data, the video data is generally compressed using an encoder to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the size, resolution, and frame rate of video are gradually increasing, and accordingly the amount of data to be encoded is also increasing. Therefore, a new compression technique having better encoding efficiency and higher image quality than the existing compression technique is required.

For compression of video data, each of the blocks in a picture may be predictively encoded. In general, prediction of a current block is performed using an intra-prediction technique (using data from a picture containing the current block) or an inter-prediction technique (using data from a picture which was encoded before a picture containing the current block). The inter-prediction includes both unidirectional prediction and bi-directional prediction.

The first picture included in a video bitstream, or a random access picture that enables random access at an arbitrary position, such as an Instantaneous Decoding Refresh (IDR) picture or a Clean Random Access (CRA) picture, is encoded using intra-prediction. In general, encoding an I (intra) picture in which the entire region of the picture is intra-predicted requires a large amount of bits compared to a P (predictive) or B (bi-predictive) picture that allows inter-prediction. This may raise issues in rate control and buffer control in terms of service. In particular, this tendency may occur more frequently as the size, resolution, and frame rate of a video gradually increases.

SUMMARY

The present disclosure is directed to a technique for gradually encoding or decoding an entire region in a picture over a plurality of pictures associated with the picture.

In accordance with one aspect of the present disclosure, a video decoding method is provided for decoding a sequence of pictures using gradual refresh. The method includes decoding, from a header of the sequence in a bitstream, a flag indicating whether the gradual refresh is allowed; decoding identification information for identifying a first picture to which the gradual refresh has been applied in the sequence, and determining a picture order count (POC) value of the first picture; decoding group size information for identifying a group of pictures associated with the first picture to which the gradual refresh has been applied; determining a POC value of a second picture corresponding to a last picture belonging to the group based on the group size information; and determining the group of pictures associated with the first picture using the POC value of the first picture and the POC value of the second picture.

In accordance with another aspect of the present disclosure, a video decoding apparatus is provided for decoding a sequence of pictures using gradual refresh. The apparatus includes one more processors configured to decode a bitstream to reconstruct pictures in the sequence; and one or more memories configured to store the reconstructed pictures. The one or more processors are configured to decode, from a header of the sequence, a flag indicating whether the gradual refresh is allowed, decode identification information for identifying a first picture to which the gradual refresh has been applied in the sequence, and determine a picture order count (POC) value of the first picture; decode group size information for identifying a group of pictures associated with the first picture to which the gradual refresh has been applied; determine a POC value of a second picture corresponding to a last picture belonging to the group based on the group size information; and determine the group of pictures associated with the first picture using the POC value of the first picture and the POC value of the second picture.

DETAILED DESCRIPTION

Figure 1:
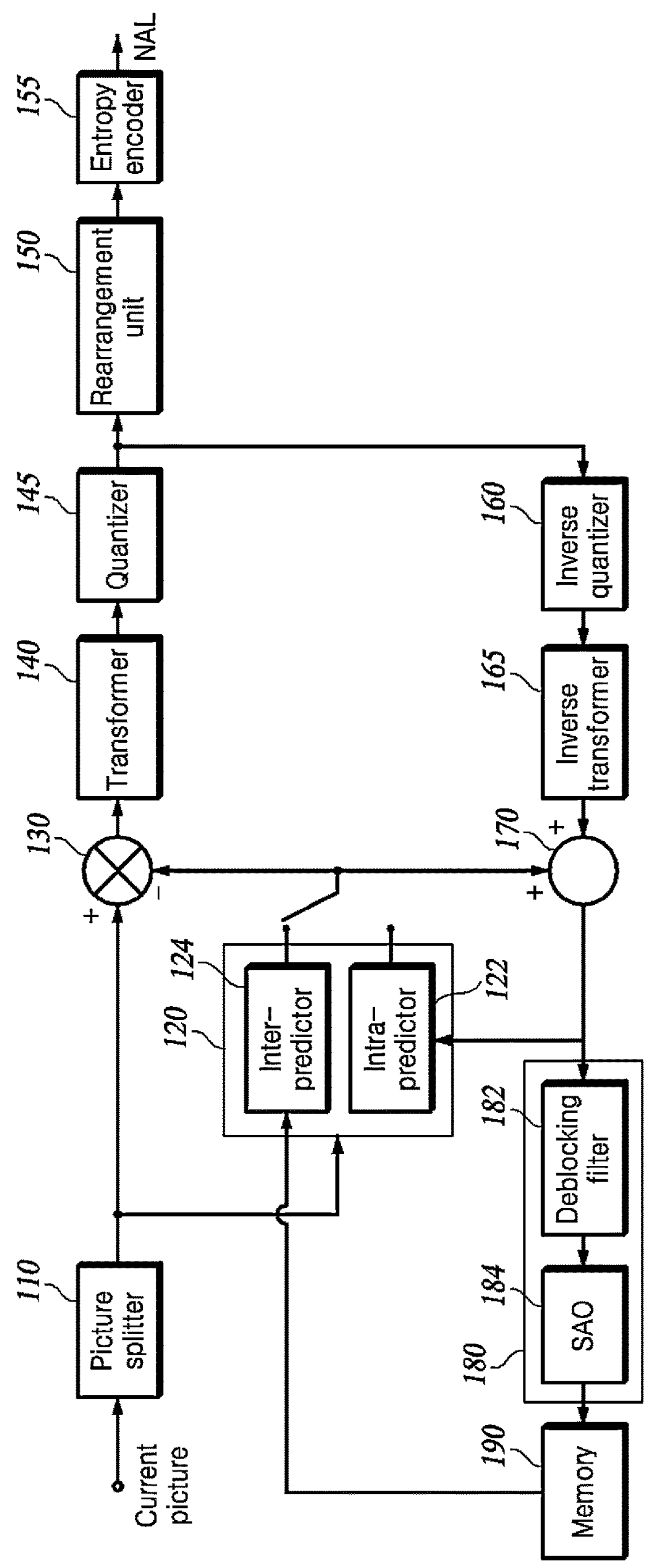
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The block splitter 110 is configured to determine the size of a coding tree unit (CTU). Information about the size of the CTU (CTU size) is encoded as a syntax of the SPS or PPS and is transmitted to the video decoding apparatus.

The block splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. In particular, BTTT may be collectively referred to as a multiple-type tree (MTT).

Figure 2:
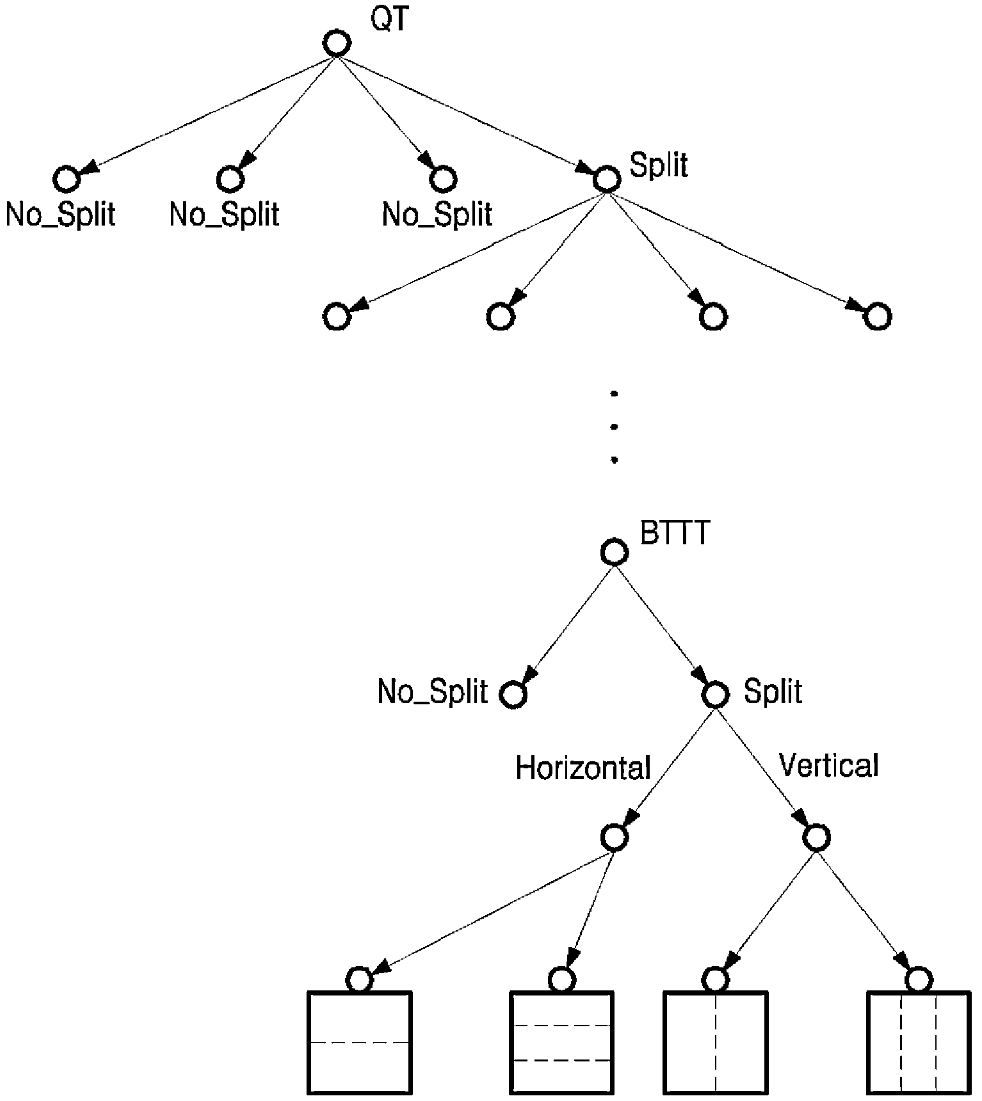
FIG. 2 is a diagram illustrating block splitting using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is equal to or less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus is configured to start encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

In particular, CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 is configured to predict the current block to generate a prediction block. The predictor 120 includes an intra-predictor 122 and an inter-predictor 124.

Figure 3:
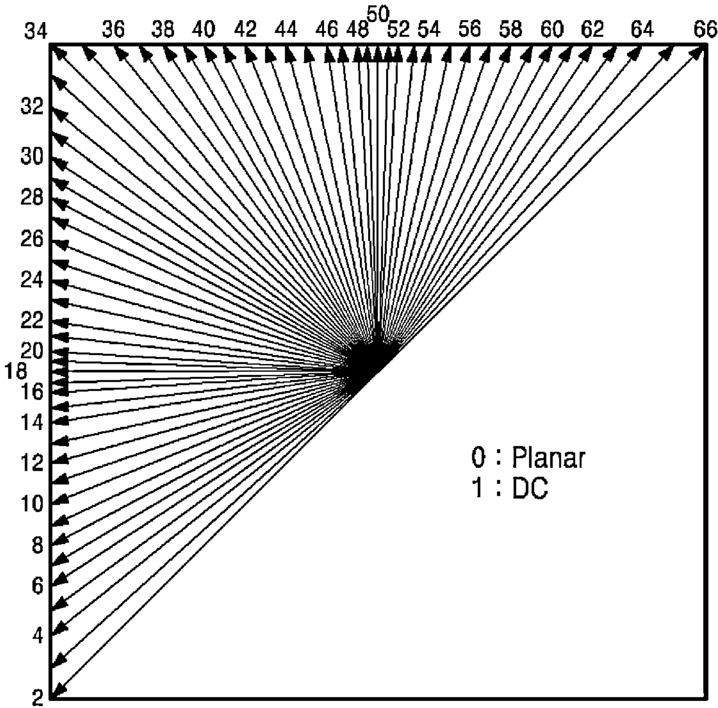
FIG. 3 is a diagram illustrating a plurality of intra-prediction modes.

The intra-prediction unit 122 is configured to predict pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and select an intra-prediction mode that has the best rate distortion characteristics among the tested modes.

The intra-predictor 122 is configured to select one intra-prediction mode from among the plurality of intra-prediction modes, and predict the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 is configured to generate a prediction block for the current block through motion compensation. The inter-predictor 124 is configured to search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component.

The motion information including information about the reference picture and information about the motion vector used to predict the current block is encoded by the entropy encoder 155 and transmitted to the video decoding apparatus. The inter-predictor 124 may be configured to perform interpolation on a reference picture or a reference block to increase the accuracy of prediction. In other words, subpixels between integer pixels are interpolated using integer pixels. When a process of searching for a block that is most similar to the current block for the interpolated reference picture is performed, the motion vector may be expressed not to the precision of the integer pixel unit but to the precision of the fractional pixel unit. The precision or resolution of the motion vector may be set differently for each unit of a target region to be encoded, such as a slice, tile, CTU, or CU.

The subtractor 130 is configured to subtract the prediction block generated by the intra-predictor 122 or the inter-predictor 124 from the current block to generate a residual block. The transformer 140 may be configured to split the residual block into one or more transform blocks, and apply the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block, using the entire size of the residual block as a transform unit. Alternatively, the residual block may be partitioned into a plurality of subblocks and the residual signals in a subblock may be transformed using the subblock as a transform unit.

The transformer 140 may be configured to individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may be configured to select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 is configured to quantize transform coefficients output from the transformer 140, and output the quantized transform coefficients to the entropy encoder 155. For some blocks or frames, the quantizer 145 may be configured to directly quantize a related residual block without transformation.

The rearrangement unit 150 may be configured to reorganize the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 is configured to encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 is configured to encode information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type.

The inverse quantizer 160 is configured to inversely qauntize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block.

The adder 170 is configured to add the reconstructed residual block to the prediction block generated by the predictor 120 to reconstruct the current block. The pixels in the reconstructed current block are used as reference pixels in performing intra-prediction of a next block. The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 180 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding. The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
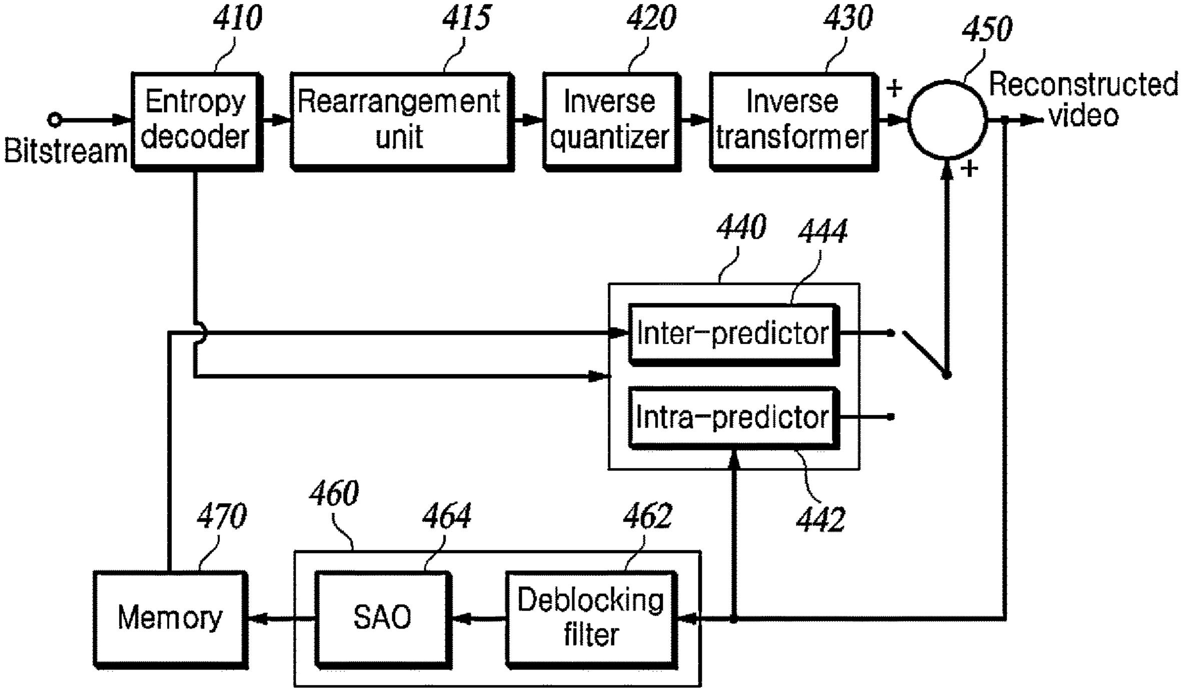
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4. The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extracting information related to block splitting, and extract prediction information and information about a residual signal, and the like required to reconstruct the current block.

The entropy decoder 410 is configured to extract information about the CTU size from the sequence parameter set (SPS) or the picture parameter set (PPS), determines the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is also configured to extract information about quantized transform coefficients of the current block as information about the residual signal. The rearrangement unit 415 may be configured to change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 is configured to inversely quantize the quantized transform coefficients. The inverse transformer 430 is configured to inversely transform the inversely quantized transform coefficients from the frequency domain to the spatial domain, thereby generating a reconstructed residual block for the current block. In addition, when MTS is applied, the inverse transformer 430 is configured to determine a transform function or a transform matrix to be applied in the horizontal and vertical directions, respectively, based on MTS information (mts_idx) signaled from the video encoding apparatus, and inversely transform the transform coefficients in the transform block in the horizontal and vertical directions based on the determined transform function.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction. The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode.

The inter-predictor 444 is configured to determine a motion vector of the current block and a reference picture referred to by the motion vector using the syntax element for the inter-prediction information extracted from the entropy decoder 410, and predict the current block based on the motion vector and the reference picture. The adder 450 is configured to reconstruct the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

As described above, the video encoding apparatus or the video decoding apparatus encodes and decodes one picture in units of blocks. Pictures may be classified into an I (intra) picture in which only intra prediction is allowed, a P (predictive) picture in which inter-prediction and intra-prediction are allowed together, or a B (bi-predictive) picture in which bi-directional inter-prediction is allowed. The first picture in the video bitstream, or a random access picture, such as an Instantaneous Decoding Refresh (IDR) picture or a Clean Random Access (CRA) picture that enables random access at an arbitrary position is an I picture. Typically, a substantial amount of bits is required to encode the I (intra) picture, in which the entire region of the picture is intra-predicted.

As the coding efficiency of P or B pictures increases through inter-picture reference, i.e., inter-prediction, due to the development of encoding and decoding technology, the difference in bit amount between I and P or B pictures may increase, which may raise issues regarding rate control, buffer control, and the like in terms of service. In addition, when an error occurs due to an environment of a transport channel on which a bitstream is transmitted, the error may be concentrated in the I picture. In particular, this effect may occur more frequently as the size, resolution, and frame rate of a video gradually increase.

The following disclosure presents a technique of gradually encoding or decoding an entire region of a picture over a plurality of pictures associated with the picture in order to improve the aforementioned issues. The video encoding apparatus may encode a sequence of pictures, and the video decoding apparatus may decode the sequence of the pictures using the above-described method. A picture (first picture) in the sequence may form one group in association with a plurality of pictures. Each picture in the group includes a refresh region. As pictures in the group are decoded, refresh regions may be gradually decoded. Once all refresh regions are decoded, a complete picture with all regions refreshed may be generated. The complete picture with all regions refreshed may be the last picture (second picture) belonging to the group. In other words, the individual regions are gradually refreshed over a plurality of pictures belonging to the group such that all regions in the pictures are refreshed when the second picture is reached.

Hereinafter, a group of a plurality of pictures associated with the first picture may be referred to as an IR (intra-refresh) group or a gradual random access (GRA) group. In addition, a refresh region in each picture belonging to the group may be referred to as an intra-refresh unit (IRU) or a gradual random access unit (GRU). Also, the first picture may be referred to as an IR picture or a GRA picture.

The video decoding apparatus may be configured to correctly or more accurately decode all the pictures from the last picture (the second picture) of the group in decoding order. The last picture (the second picture) in the group may serve as a reference picture for one or more encoded subsequent pictures following the group in decoding order. Furthermore, the group or the last picture in the group may serve as a random access picture for one or more encoded subsequent pictures following the group in decoding order.

Hereinafter, a technique of the present disclosure will be described in detail with reference to the drawings.

Figure 5A:
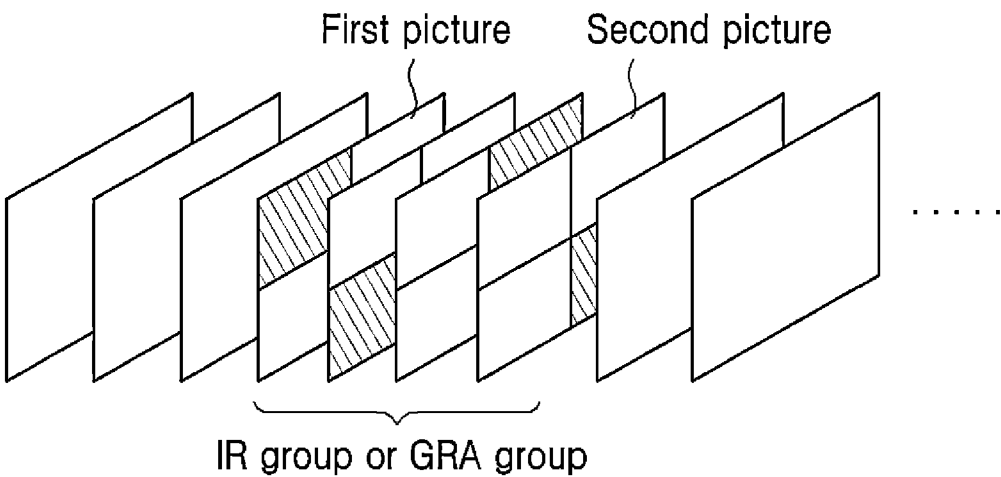
FIGS. 5A-5B are exemplary diagrams illustrating video encoding or decoding according to an aspect of the present disclosure
Figure 5B:
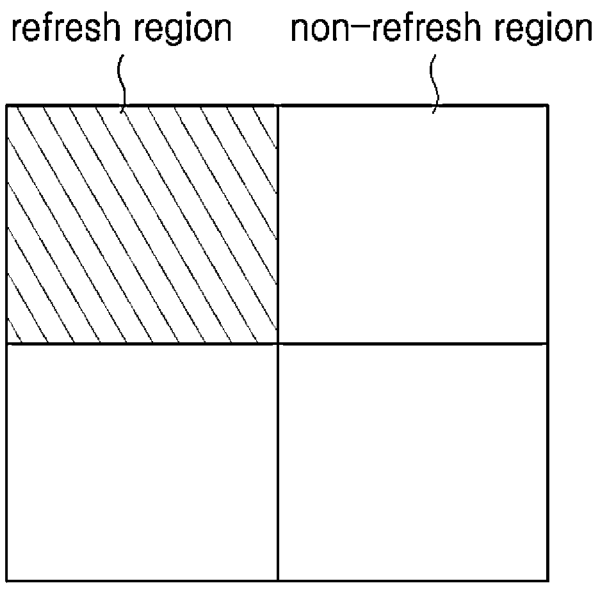

FIGS. 5A-5B are exemplary diagrams illustrating the technique of the present disclosure.

FIG. 5A shows a sequence of pictures. The video encoding apparatus sequentially encodes each picture on a per block basis according to an encoding order, and transmits the same to the video decoding apparatus. The video decoding apparatus decodes each picture on a per block basis according to a decoding order. The sequence of pictures may include pictures belonging to a group (IR group or GRA group) of pictures to which gradual refresh is applied. Information or a flag indicating whether gradual refresh may be applied to the sequence of pictures may be signaled in the header of the sequence, that is, the SPS. For example, when the flag indicates a first value (e.g., 1), pictures to which gradual refresh is applied may be present in the sequence.

When the flag indicates a second value (e.g., 0), no picture to which the gradual refresh is applied is present in the sequence.

When the flag indicates that the gradual refresh is applicable to the sequence, information for identifying an IR group in the sequence is signaled. As an example, when the time interval at which the IR group appears in the sequence is constant, and the size of the group, that is, the number of pictures belonging to the group, is constant, information about the interval between IR groups and the size of the IR groups may be signaled once in a sequence unit.

In another example, IR groups may be irregularly present in the sequence. In particular, information for identifying each IR group in the sequence is required. This information may be signaled on a per-picture basis, that is, as a syntax of a picture header, and may include information indicating whether a picture is an IR picture and the size of an IR group. As an example, the video decoding apparatus obtains identification information indicating whether the picture corresponding thereto is a picture to which gradual refresh is applied, by decoding header information of the corresponding picture. When the identification information indicates that the gradual refresh has been applied to the corresponding picture, the video decoding apparatus decodes information indicating the size of a group of pictures associated with the corresponding picture, that is, an IR group. The identification information and information indicating the size of the IR group may be included in the first picture representing a start picture of the IR group.

In general, a bitstream contains information indicating a picture order count (POC) of a picture. This information may be included in, for example, a picture header. Accordingly, the video decoding apparatus may be configured to determine the POC value of the first picture that is the start picture of the IR group. In addition, the POC of the second picture, which corresponds to the last picture of the IR group, may be determined with the size information about the IR group. For example, the POC value of the second picture may be derived by adding the POC value of the first picture and the value indicated by the group size information. The video decoding apparatus is configured to determine pictures having a POC value greater than or equal to the POC value of the first picture and less than or equal to the POC value of the second picture as the IR group.

As shown in FIG. 5B, a group of pictures associated with the first picture, that is, pictures belonging to the IR group, includes a refresh region and a non-refresh region. In particular, the refresh region may be a region in which image data can be correctly and accurately encoded/decoded, and the non-refresh region may be a region in which correct and more accurate encoding/decoding of image data is not guaranteed. For example, one picture to be encoded or decoded may be partitioned into a plurality of regions and distributed to a plurality of pictures belonging to an IR group. Image data corresponding to the plurality of regions are gradually encoded or decoded over the plurality of pictures. The plurality of pictures may be defined as the IR group. A plurality of regions which are respectively included in the pictures belonging to the IR group may be defined as refresh regions, and the other region of each picture except the refresh region may be defined as non-refresh region.

A picture belonging to the IR group may be an I picture, a P picture, a B picture, or a random access picture such as IDR or CRA. However, not all pictures in the IR group may be random access pictures. The refresh region in each picture belonging to the IR group may be composed of a CU, a CTU, a tile, a group of tiles, a slice, or a group of slices.

The video decoding apparatus decodes the refresh region in a picture belonging to the IR group. In general, the refresh region is encoded through intra-prediction, but is not limited thereto. The video decoding apparatus reconstructs the refresh region by decoding the intra-prediction mode for each block (CU) included in the refresh region and reconstructing each block according to the intra-prediction mode.

The non-refresh region may be reconstructed through intra-prediction or inter-prediction. When a block in the non-refresh region is inter-predicted, a prediction block may be generated by copying a predefined value. For example, the prediction block may be padded with pixel values at the same position as the non-refresh region in the previously generated reference picture. In particular, the previously generated reference picture may be a reference picture shared between the encoding apparatus and the decoding apparatus. As an example, the previously generated reference picture may be a picture having a POC closest to that of a picture to be currently decoded. As another example, it may be a picture padded with a value derived from a bit depth of a pixel. For example, a value corresponding to half of the maximum value expressible by the bit depth may be used as the padding value. When the bit depth is 8, the padding value is 128, which is half of 256, the maximum value that may be expressed in 8 bits. As another example, information on a reference picture that is referred to by the non-refresh region may be signaled from the video encoding apparatus to the video decoding apparatus.

Figure 6:
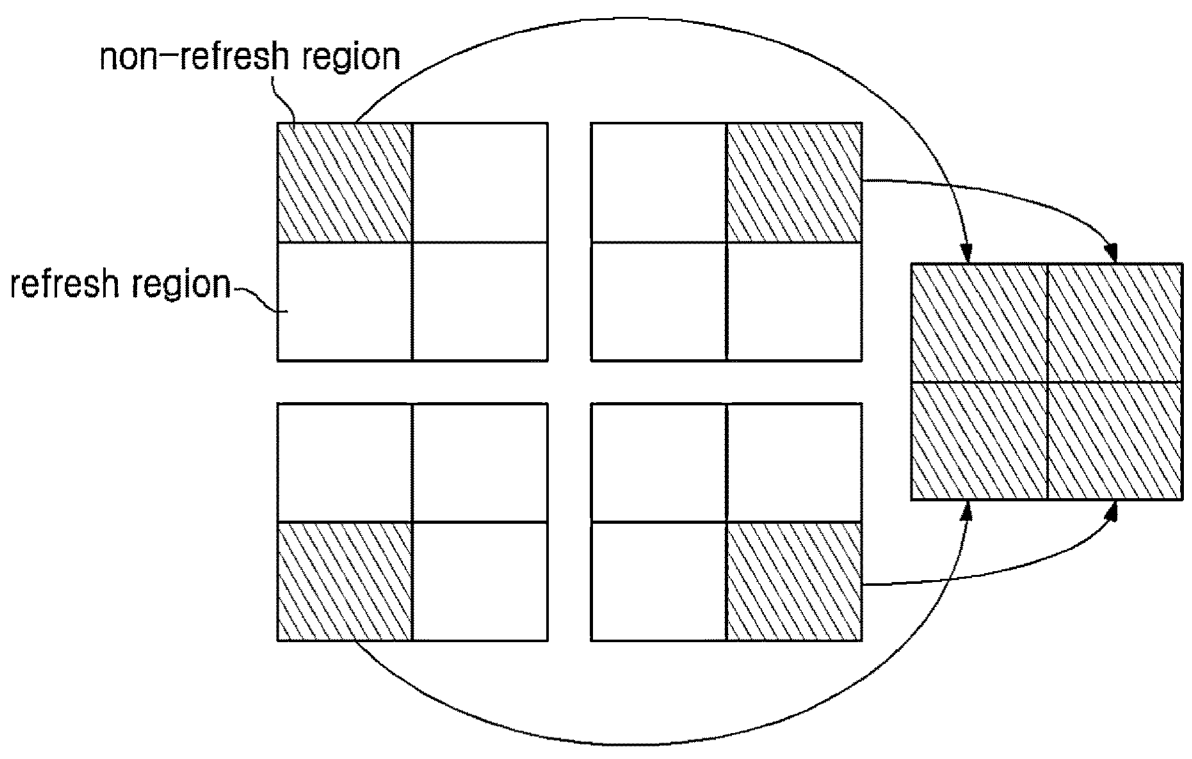
FIG. 6 is an exemplary diagram illustrating a method of generating a picture by combining refresh regions decoded over pictures belonging to an IR group according to an aspect of the present disclosure.

Alternatively, only the refresh region of each picture belonging to the IR group may be decoded, and the decoding process for the non-refresh region may be skipped. Once decoding of all pictures belonging to the IR group from the first picture to the second picture is completed, the video decoding apparatus may be configured to generate one picture in which the refresh regions of the pictures are combined, as shown in FIG. 6. A picture composed of only refresh regions is used as a reference picture for other pictures to be decoded subsequently after the IR group. A picture including a non-refresh region is not guaranteed to be correctly and accurately encoded/decoded. Therefore, a restriction may be required that the picture including the non-refresh region is not used as a reference picture of other pictures to be decoded after the IR group.

Figure 7A:
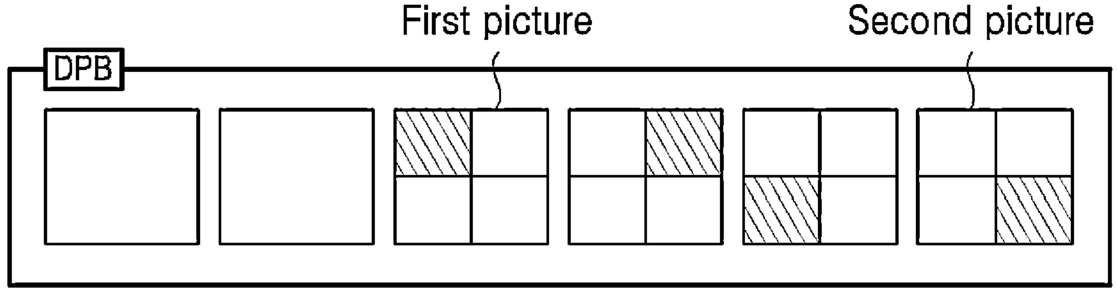
FIGS. 7A-7B are exemplary diagrams illustrating a method of storing and managing pictures belonging to a decoded IR group in a memory according to an aspect of the present disclosure.
Figure 7B:
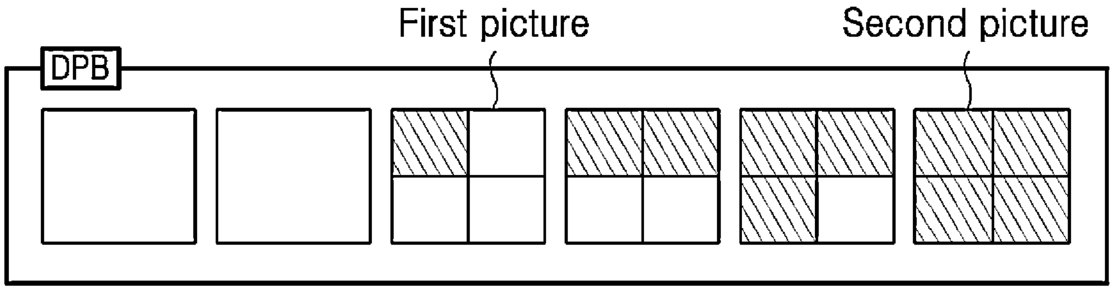

FIGS. 7A-7B are diagrams illustrating a method of storing and managing a decoded picture of an IR group in a memory. Once decoding of the refresh regions and the non-refresh regions of the pictures belonging to the IR group is completed, each picture may be stored in the memory (e.g., DPB, decoded picture buffer) with a different POC value assigned thereto, as shown in FIG. 7A. When the second picture is set as a displayed picture or a picture referenced by other pictures to be decoded after the IR group, a picture having the refresh regions in the IR group combined as shown in FIG. 6 is displayed or referenced by another picture.

As another example, as shown in FIG. 7B, the refresh region of the picture that is decoded first among the pictures belonging to the IR group is stored in the memory in a manner that the decoded refresh region replaces the non-refresh region at the same position in a picture to be decoded next. According to this method, the second picture stored in the memory becomes one picture composed of only refresh regions from each picture belonging to the IR group. When the second picture is set as a displayed picture or a picture referenced by other pictures to be decoded after the IR group, the second picture may be displayed or referenced by other pictures.

According to the memory storage/management method described with reference to FIGS. 7A-7B, there may be a restriction that displaying other pictures in the IR group should not be allowed except for the second picture, which is the last picture. In other words, pictures having a POC value greater than or equal to that of the first picture, which is the start picture of the IR group, and less than that of the second picture, which is the last picture, are not allowed to be displayed.

Figure 8A:
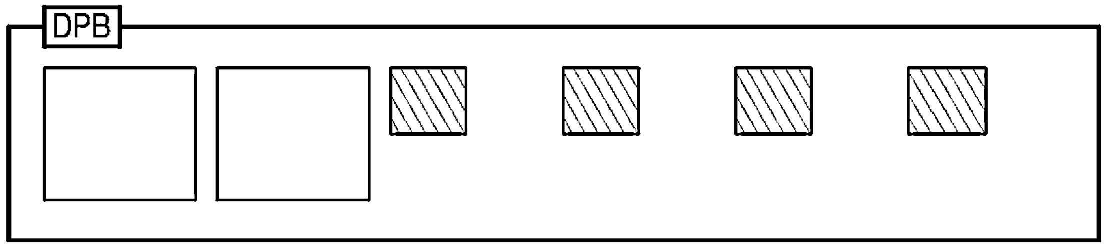
FIGS. 8A-8C are exemplary diagrams illustrating another method of storing and managing pictures belonging to a decoded IR group in a memory according to an aspect of the present disclosure.
Figure 8B:
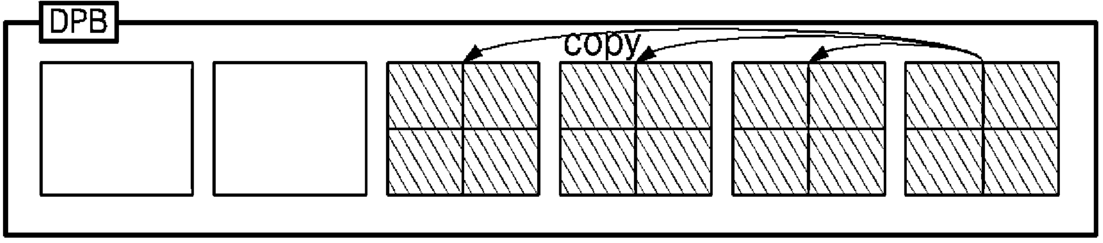
Figure 8C:

FIGS. 8A-8C show another example of a method of storing and managing a decoded picture of an IR group in a memory. The example of FIGS. 8A-8C may be applied in the case where only a refresh region belonging to each picture in the IR group is decoded, but is not limited thereto.

As an example, as shown in FIG. 8A, only the refresh regions in the respective pictures belonging to the IR group may have different POC values when stored in the memory. As another example, after decoding of all refresh regions is completed, the non-refresh region of each picture belonging to the IR group may be filled with the refresh region at the same position of another picture. In the memory, as shown in FIG. 8B, the same pictures composed of refresh regions may be stored in the memory with different POCs. As another example, as shown in FIG. 8C, after decoding of all refresh regions belonging to the IR group is completed, only a picture composed of only refresh regions may be stored in the memory. In particular, the picture composed of only refresh regions is stored in the memory with the POC value of the second picture.

According to the example of FIGS. 8A-8C, the pictures belonging to the IR group and stored in the memory may be displayed individually and be used as reference pictures for pictures to be decoded after the IR group.

Figure 9:
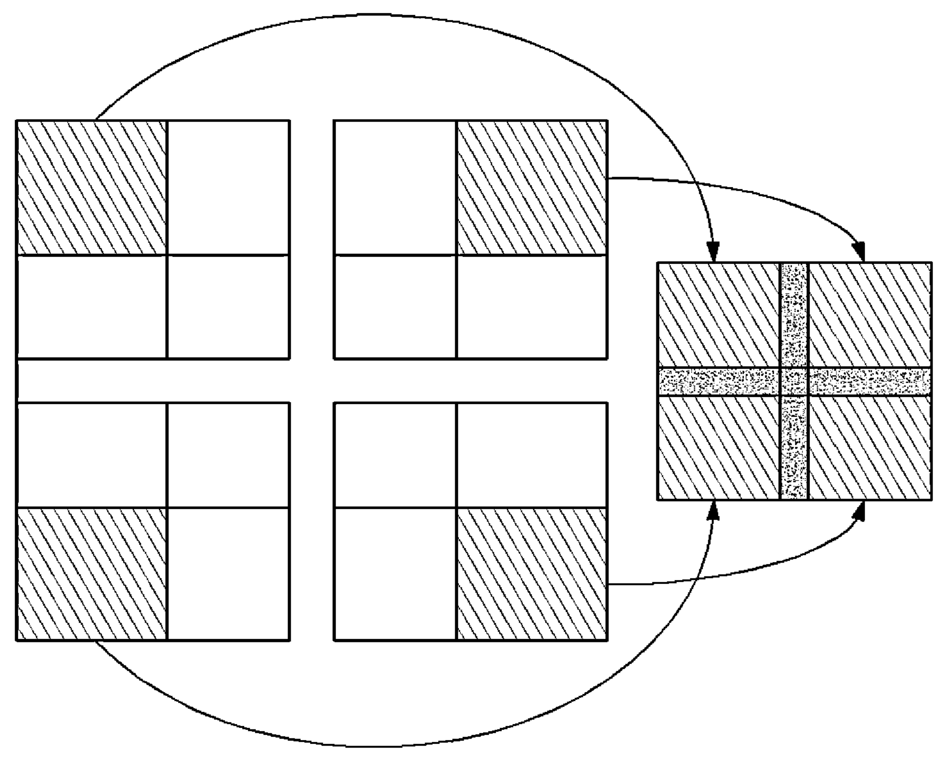
FIG. 9 is an exemplary diagram illustrating another method of generating a picture by combining refresh regions decoded over pictures belonging to an IR group according to an aspect of the present disclosure.

Position information for identifying the positions of the refresh regions in the pictures belonging to the IR group may be signaled from the video encoding apparatus to the video decoding apparatus. The position information may be an index or coordinates identifying a CTU, a tile, or a tile group. As shown in FIG. 9, the position information may be set such that at least some of the refresh regions spatially overlap each other. In particular, after decoding the refresh regions belonging to the IR group, the video decoding apparatus may be configured to apply filtering such as weighted averaging to the regions that overlap each other, and store the filtered refresh regions or a picture including the filtered refresh regions. The video decoding apparatus may be configured to perform filtering using a filter predetermined in association with the video encoding apparatus. Alternatively, the video encoding apparatus may signal information about filter coefficients for filtering of overlapping regions to the video decoding apparatus, and the video decoding apparatus may filter the overlapping regions based on the filter coefficient information.

Figure 10:
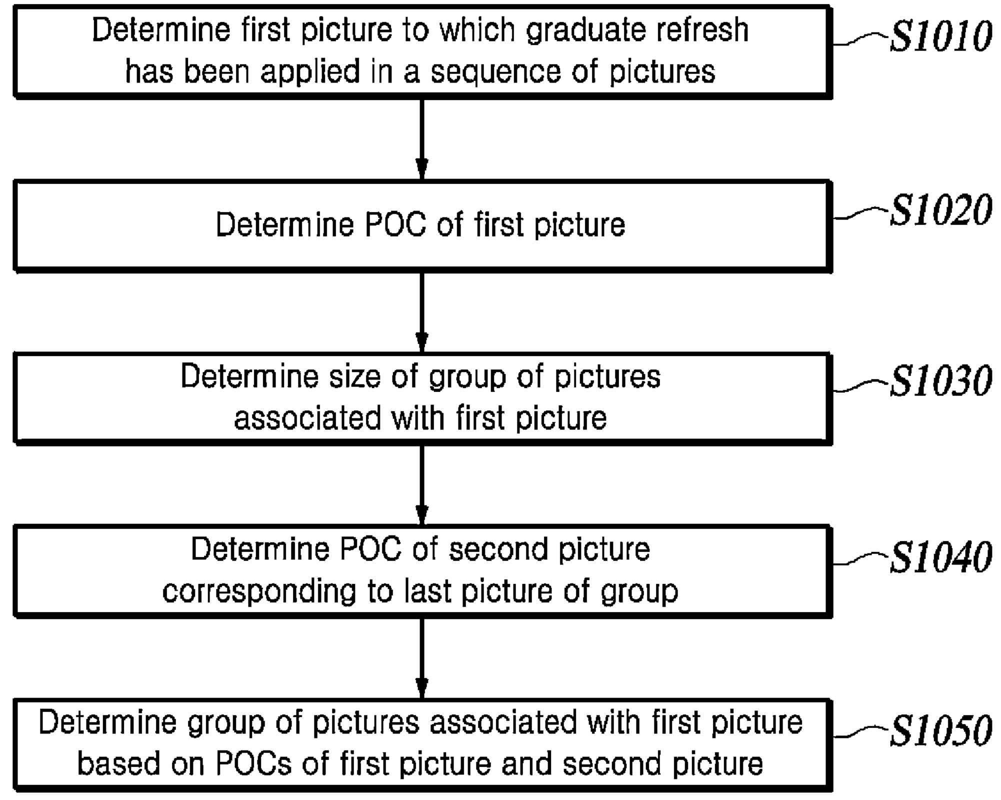
FIG. 10 is a flowchart illustrating a method of identifying an IR group in a sequence of pictures, for decoding a video using gradual refresh, according to an aspect of the present disclosure.

FIG. 10 is a flowchart illustrating a method of identifying an IR group in a sequence of pictures, for decoding a video using gradual refresh, according to an embodiment of the present disclosure.

The video decoding apparatus is configured to receive a bitstream generated by encoding a sequence of pictures, and determine a first picture to which a gradual refresh has been applied in the sequence (S1010). For example, as described above, the first picture to which the gradual refresh has been applied may be identified by decoding, from the header of each picture in the sequence, identification information indicating whether the corresponding picture is a picture to which the gradual refresh has been applied. Then, the POC value of the first picture is determined (S1020). The POC value may be derived from information in the bitstream, for example, POC information included in the header of the first picture.

Thereafter, the video decoding apparatus is configured to decode size information about a group (IR group) of pictures associated with the first picture to which the gradual refresh has been applied, and determine the size of the IR group (S1030). The size information may be extracted from the header of the first picture. Then, the POC value of a second picture corresponding to the last picture of the IR group is determined based on the determined group size (S1040). The video decoding apparatus may be configured to determine the POC value of the second picture corresponding to the last picture in the IR group by adding the group size determined from the size information to the POC value of the first picture. The IR group may be determined as pictures having a POC value greater than or equal to that of the first picture and less than or equal to that of the second picture (S1050). Pictures in the IR group are decoded and stored in a memory in the manner as described above. Since this operation has been described in detail above, further description will be omitted.

Figure 11:
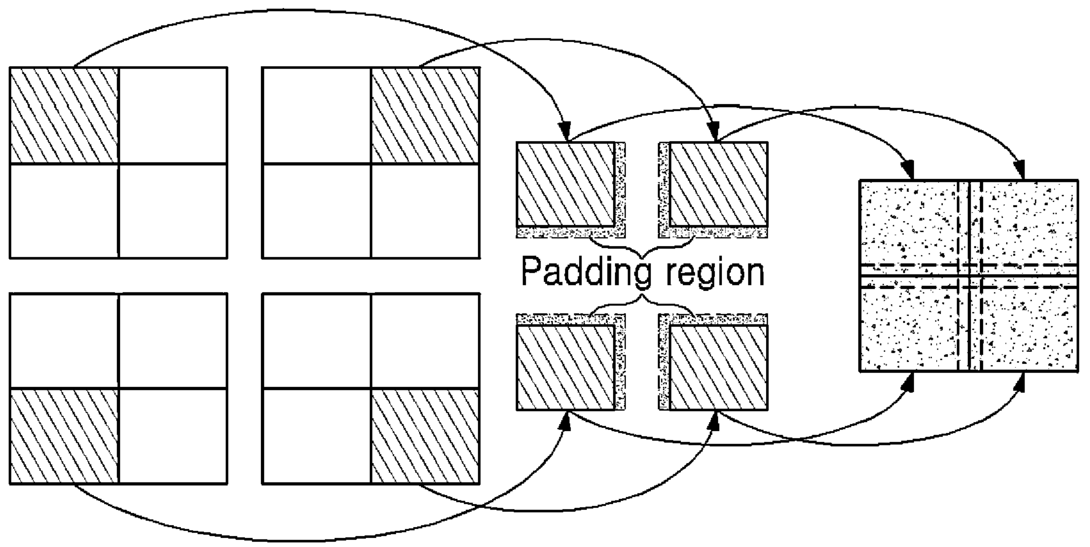
FIG. 11 is an exemplary diagram illustrating a method for post-processing decoded pictures in an IR group according to an aspect of the present disclosure.

Hereinafter, a method of post-processing the decoded refresh regions after decoding of the refresh regions of pictures belonging to the IR group will be described. FIG. 11 is an exemplary diagram illustrating a post-processing method for decoded pictures of an IR group according to an embodiment described in the present disclosure.

As shown in FIG. 11, the video decoding apparatus may extend each of the refresh regions by padding a certain range outside the boundary of the refresh region with reconstructed pixels near the boundary in the decoded refresh region. When the refresh regions are combined to form one reference picture, the refresh regions overlap each other due to the padded regions. Accordingly, as described with reference to FIG. 9, after filtering regions that overlap each other, the video decoding apparatus may be configured to store the filtered refresh regions or a picture including the filtered refresh regions in the memory. The size of the padded region may be a size shared between the video encoding apparatus and the video decoding apparatus, or may be signaled from the video encoding apparatus to the video decoding apparatus. This post-processing method may be used to reduce artifacts produced at the refresh region boundary during combination of the refresh regions.

Figure 12A:
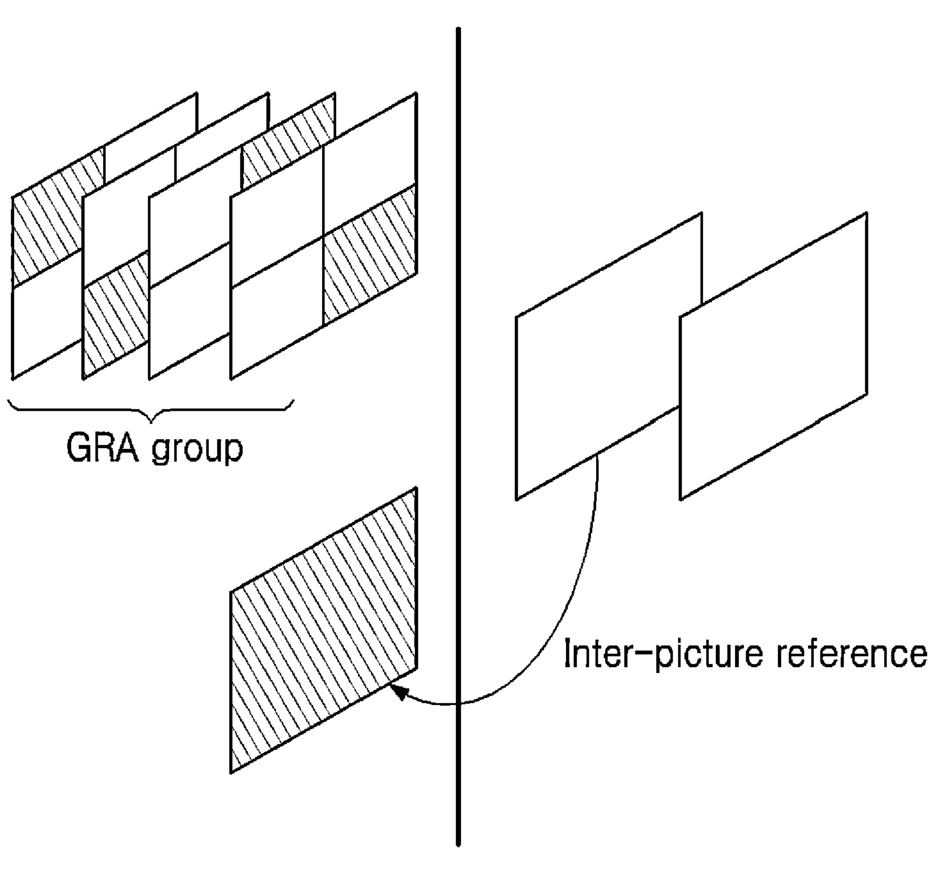
FIGS. 12A-12B are exemplary diagrams illustrating another method for post-processing decoded pictures in an IR group according to an aspect of the present disclosure.
Figure 12B:
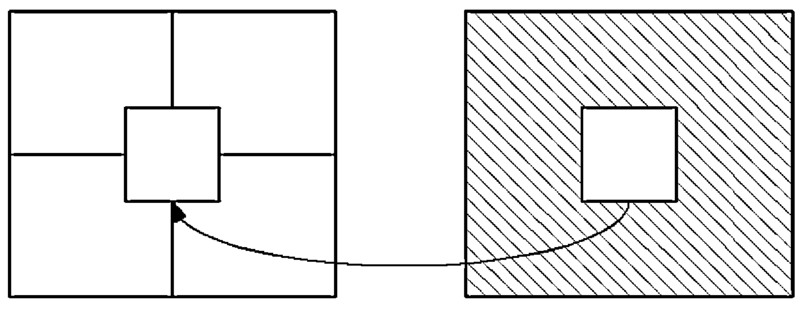

FIGS. 12A-12B are exemplary diagrams illustrating a post-processing method for decoded pictures of an IR group according to another embodiment described in the present disclosure. As shown in FIG. 12A, pictures in the IR group or a picture generated by combining refresh regions of the pictures belonging to the IR group may be used as a reference picture for inter-prediction of other pictures to be decoded after the IR group.

Pictures composed of refresh regions may have artifacts at the boundary between the refresh regions. Therefore, as shown in FIG. 12B, when a picture composed of refresh regions is used as a reference picture for inter-prediction of a block in another picture to be decoded after the IR group, the artifacts may decrease the accuracy of prediction, lower encoding efficiency, and deteriorate subjective image quality of a displayed picture. Therefore, in some embodiments of the present disclosure, in storing the decoded pictures of the IR group in a memory, displaying a picture combining refresh regions of the pictures belonging to the IR group, or using pictures belonging to the IR group or the picture combining the refresh regions as a reference picture, the video decoding apparatus may perform filtering on the boundary between refresh regions.

The video encoding apparatus may signal information or a flag indicating whether filtering is allowed at the boundaries of the refresh regions to the video decoding apparatus through a syntax of a high level, e.g., the SPS, the picture header of the IR group, or the header of the refresh region in a picture of the IR group. The video decoding apparatus may be configured to determine whether to apply filtering to the refresh region boundary according to the signaled information.

Alternatively, whether to allow filtering at the boundaries of the refresh regions may be adaptively determined based on at least one of an illumination filter applied to the refresh region, a size or quantization parameter (QP) information associated with the reference block referenced in the refresh region, the intra-prediction mode of the reference signal, the type of a transform function applied to the reference signal, a precision of a motion vector difference or a motion vector of a block to be currently encoded/decoded. For example, when no illumination filter is applied to adjacent refresh regions, when the applied illumination filters are the same or similar, or when the difference in quantization parameter between two refresh region blocks near the boundary between the adjacent refresh regions is less than or equal to a preset threshold, filtering may not be performed. The video decoding apparatus may be configured to acquire the above-described information for determining whether to allow filtering from the previously reconstructed information. Accordingly, the video decoding apparatus may be configured to determine whether filtering is allowed, without receiving additional information from the video encoding apparatus. In other words, signaling for additional information indicating whether to allow filtering is not required.

Filter information for filtering the boundary between refresh regions may be explicitly signaled from the video encoding apparatus to the video decoding apparatus. The filter information may be included in the header of at least one of a target picture to be currently encoded/decoded, a slice or tile or CTU to be currently encoded/decoded in the target picture, a picture referenced in the IR group by the target picture, or a refresh region of a picture in the IR group. For example, the filter information may be signaled from the video encoding apparatus to the video decoding apparatus as the syntax of the last picture (the second picture in FIG. 5A) in the IR group. Alternatively, the filter information may be signaled as syntax of a picture decoded after the IR group and referring to a picture in the IR group (e.g., a picture composed of refresh regions of the respective pictures in the IR group).

The filter information may be filter coefficient information or information for selecting one of a plurality of filters. When a plurality of filters is used, the plurality of filters may be predetermined between the video encoding apparatus and the video decoding apparatus. Alternatively, the video encoding apparatus may be configured to select one filter set from among filter sets each composed of one or more filters, and signal information indicating the selected filter set to the video decoding apparatus.

The filter information may not be signaled, but may be derived using various pieces of pre-decoded information. For example, it may be derived through at least one of the illumination filter of the refresh region, the size of the reference block, the QP information about each signal referenced in the refresh region, the intra-prediction mode of the reference signal, the type of the transform function applied to the reference signal, the reference mode, the precision of the motion vector difference, the precision of the motion vector, the size of the prediction block, the type of the chroma component, or the range of the luma component.

As an example, the video encoding apparatus and the video decoding apparatus may adaptively determine a filter coefficient or a filter length, using a value of the illumination filter applied to the refresh region as a weight. Alternatively, the value of a filter coefficient or a filter length may be adaptively determined according to the type of the transform function applied to the reference signal. Alternatively, the intensity of the filter may be adaptively determined according to one or more of the size of the reference block or QP information about each referenced signal, the shape of the reference block, or the precision of the motion vector difference or the motion vector of the block to be currently decoded, and determine the filter coefficient or the filter length according to the intensity.

In addition, when a reference signal in an IR picture is decoded by intra-prediction, a filtering direction may be determined according to the intra-prediction direction. Alternatively, filter information may be derived from a neighboring block according to a reference mode (unidirectional prediction, bidirectional prediction, etc.) of the current block or a relationship between the reference modes of the current block and the neighboring block. For example, the same filter as used for the neighboring block may be used. Alternatively, a filter index for selecting one of a plurality of filters may be derived based on the precision of the motion vector difference, the precision of the motion vector, the size of the prediction block, the type of the chroma component, the range of the luma component, and the like.

In this way, filter information such as the coefficient of the filter, the length of the filter, the intensity of the filter, and the direction of the filtering may be derived using a combination of one or more pieces of information exemplarily described above. Alternatively, filter information derived through the above-described method may be used as prediction information for a filter to be actually applied. In particular, the differential filter information is signaled from the video encoding apparatus to the video decoding apparatus. The video decoding apparatus may be configured to derive filter information to be actually applied, based on the derived filter information (prediction information) and the differential filter information.

According to some embodiments of the present disclosure, different filtering may be applied to each of the refresh regions. In particular, filter information, such as a filter coefficient or an index indicating one of a plurality of filters, is signaled for each refresh region constituting the IR group. Alternatively, mapping information between the refresh region (or a block in the refresh region) and the filter index may be signaled. The video decoding apparatus may be configured to determine a filter to be applied to each refresh region based on the filter index mapped to each refresh region.

In another embodiment, the same filter information may be shared among all refresh regions in the IR group. The video decoding apparatus may be configured to perform filtering by applying the same filter information to all refresh regions in the IR group. The shared filter information may be predetermined between the video encoding apparatus and the decoding apparatus.

In another embodiment, a flag indicating whether filter information is shared between all refresh regions in the IR group may be signaled by the video encoding apparatus. When filter information is shared, the shared filter information (e.g., an index for indicating one of a plurality of filters, information for inferring the index, or coefficient information about a shared filter) may be signaled. The video decoding apparatus may be configured to perform filtering by applying the same filter information to all refresh regions based on the shared filter information. When filter information is not shared, the video decoding apparatus may be configured to decode filter information for each refresh region and apply different filtering to each refresh region as described above.

Filtering operations may be performed, for a picture belonging to the IR group, sequentially or simultaneously on both the inside of the refresh region and the boundary of the refresh region. When the filtering is sequentially performed, the video decoding apparatus first filters the inside of the refresh region when each refresh region is decoded. For example, deblocking filtering or SAO filtering described above may be applied to the inside of the refresh region. Filtering on the refresh region boundary may be performed when decoding of all refresh regions is completed, that is, when the refresh regions included in the last picture of the IR group are decoded. When the filtering is simultaneously performed, filtering according to the present disclosure may be performed the inside of the refresh region and the boundary of the refresh region at the time that the refresh region included in the last picture of the IR group is decoded.

The video encoding apparatus may be configured to signal information indicating whether the filtering of the present disclosure is used for inter-picture reference for inter-prediction or for display. The video decoding apparatus may be configured to apply the filtering of the present disclosure when performing one or more of inter-picture reference and display according to the information. For example, when filtering is used for both reference and display, the video decoding apparatus is configured to store the filtered picture in both a memory for reference and a memory for display. When filtering is used for reference and not used in a subsequent display step, the filtered picture is stored in the memory for reference and not in the memory for display. Alternatively, the video decoding apparatus may be configured to store an un-filtered picture. The filtering may be performed when the stored picture is displayed in the future or is used as a reference picture.

As another embodiment, the video encoding apparatus may be configured to signal, through the header of the start picture (the first picture in FIG. 5A) or the header of the refresh region included in the start picture, position information about a picture from which decoding is started with reference to a filtered picture of the IR group. The video decoding apparatus is configured to decode pictures before the picture indicated by the position information among the pictures decoded after decoding of the IR group, with reference to an unfiltered picture in the IR group. Then, decoding of the picture indicated by the position information and subsequent pictures is performed with reference to the filtered pictures of the IR group.

It has been described above that the video decoding apparatus performs filtering based on the information transmitted by the video encoding apparatus. However, it is apparent that the video encoding apparatus must also perform filtering in the same manner as the video decoding apparatus to ensure compatibility between the video encoding apparatus and the video decoding apparatus.

Hereinafter, a method of managing a memory on a tile basis or a basis of group of tiles will be described. As described above, the refresh regions may be composed of one or more tiles. Therefore, the memory management method described below is naturally associated with storing and managing pictures of the IR group described above.

Figure 13:
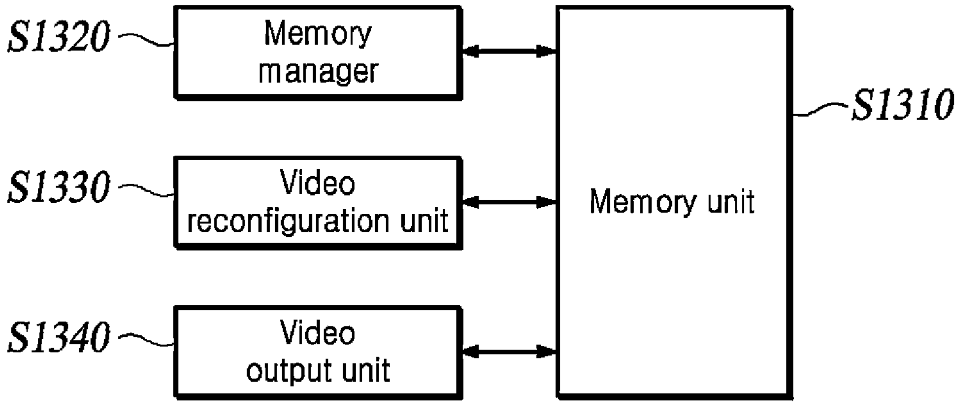
FIG. 13 is an exemplary block diagram of a memory management device for managing memory on a tile basis or a basis of group of tiles according to an aspect of the present disclosure.

FIG. 13 is an exemplary block diagram of a memory management device for managing memory on a tile basis or a basis of group of tiles according to an embodiment of the present disclosure. When the memory management device is implemented in the video encoding apparatus and video decoding apparatus described above, it may be used to manage DPBs in the devices. Each component of the memory management device may be implemented as hardware, software, or a combination of hardware and software. In addition, the function of each component may be implemented as software, and a microprocessor may be implemented to execute the function of software corresponding to each component.

Figures 14A, 14B:
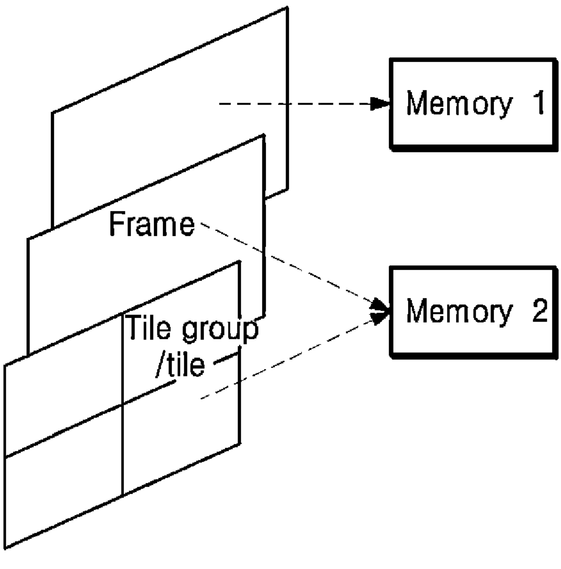
FIGS. 14A-14B are exemplary diagrams illustrating a method of managing a memory in units of tiles or groups of tiles by a memory management apparatus according to an aspect of the present disclosure.

A memory unit 1310 may include a plurality of memories for storing the reconstructed signal. The memory manager 1320 is configured to store and manage the reconstructed pictures in the memory unit 1310 using a picture or a tile group composed of one or more tiles as a unit of storage. For example, as shown in FIG. 14A, the memory manager 1310 may be configured to partition the reconstructed picture into tile groups or tiles and store the partitioned tile groups or tiles in the memory unit 1310, or combine signals reconstructed in units of tile groups or tiles into one picture and store the combined picture in the memory unit 1310.

The memory manager 1320 may be configured to determine the storage position depending on whether the target tile group to be stored is MCTs (motion constraint tile sets) that do not allow reference between tiles at different positions. For example, when the target tile group is not MCTs, reference between adjacent tile groups may be allowed. Accordingly, the target tile group is stored in the same memory as the neighboring MCTs to facilitate reference between tile groups. When the target tile group is MCTs, the target tile group is allowed only to refer to the collocated tile group in the previously decoded picture. Accordingly, the target tile group is stored in the same memory as the collocated tile group in the previously decoded picture.

The memory manager 1320 may also be configured to store the reconstructed signal in a memory on a per picture basis. In particular, the memory manager 1320 may be configured to store the reconstructed pictures in the same memory based on a temporal layer, a decoding order, or an output order.

In addition, when the reconstructed signal is stored in the memory on the per picture basis, the memory manager 1320 may be configured to continuously store all samples in the picture in the memory, or store all samples in the picture with a spacing of one or more samples between tile groups included in the picture. When the reconstructed signal is stored in the memory on a per tile group basis, the memory manager 1320 may be configured to continuously store the tile groups in the memory or store the tile groups with a spacing of one or more samples between the tile groups. In particular, a predefined value may be stored in a storage space corresponding to the sample spacing between the tile groups. For example, a value such as 128 may be used. The defined value is derived from the bit depth of the pixel. For example, the predefined value may be set to a value corresponding to half of the maximum value expressed by the bit depth. When the bit depth is 8, the predefined value is 128, which is half of 256, the maximum value that may be expressed in 8 bits.

The memory manager 1320 may be configured to delete the stored reconstructed signals from the memory on a per picture basis or a per tile group basis, as shown in FIG. 14B.

The memory manager 1320 may be configured to change the storage position of the reconstructed sample based on the reference information received from the video encoding apparatus. For example, when a plurality of tile groups is referenced to generate prediction samples of a target block to be encoded or decoded, the memory manager 1320 may be configured to identify multiple tile groups from index information on the multiple tile groups received from the video encoding apparatus, and store the identified tile groups in the same memory. Alternatively, it may identify multiple tile groups from a position of a reference block in a reference picture indicated by motion information (reference picture index and motion vector) about the target block, and store the identified tile groups in the same memory.

The video reconfiguration unit 1330 may be configured to receive reconstructed signals stored in the memory as inputs and reconfigure a picture to be output by a video output unit 1340. For example, when reconstructed signals are input from the memory on a per tile group basis, the reconstructed signals may be output on a per tile group, or the input tile groups may be reconfigured into one picture to be output on a per picture basis. The memory management method according to the present disclosure may support temporal scalability and spatial scalability on a per tile group within one picture.

Figure 15A:
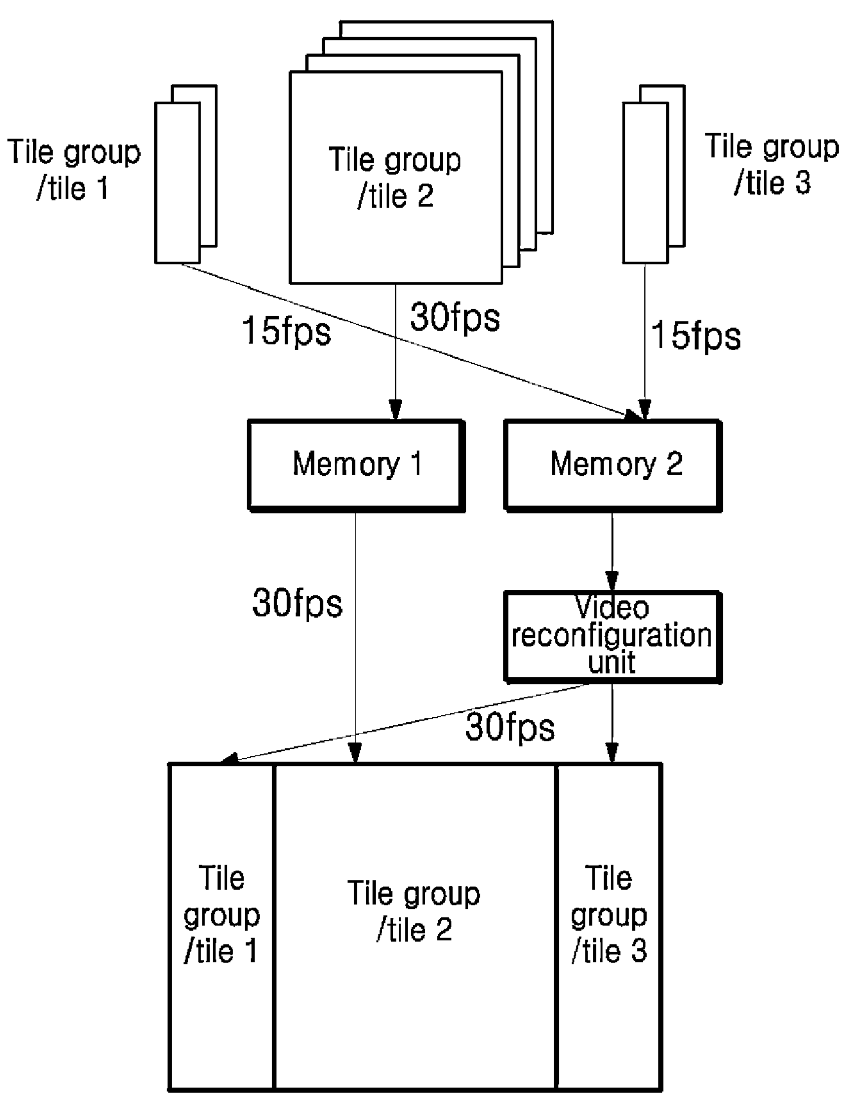
FIGS. 15A-15B are exemplary diagrams illustrating scalability supported by the memory management method according to an aspect of the present disclosure.
Figure 15B:
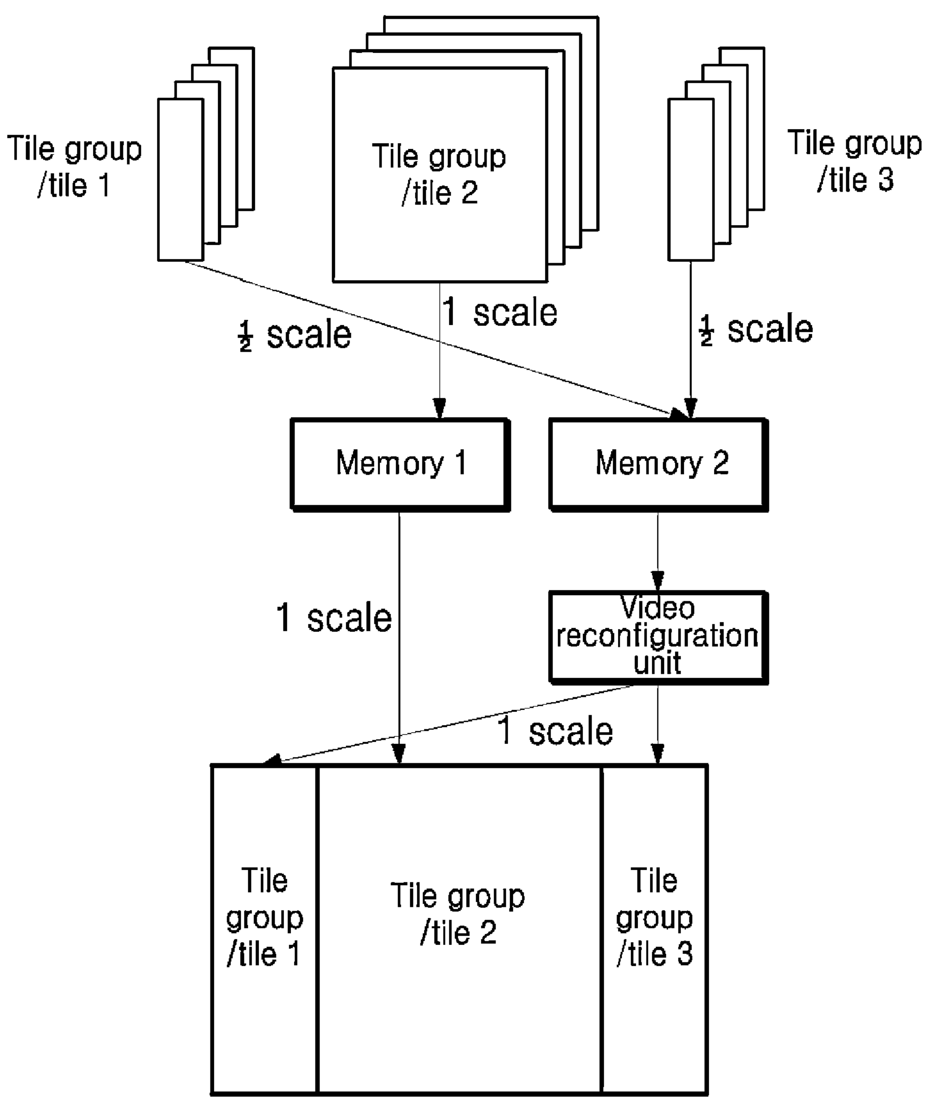

FIGS. 15A-15B are exemplary diagrams illustrating scalability supported by the memory management method according to the present disclosure. Referring to FIG. 15A, which illustrates temporal scalability, tile groups may be encoded and decoded at different frame rates. Tiles decoded at the same frame rate may be stored in the same memory. For example, tile group 2 encoded at 30 fps may be stored in memory 1, and tile groups 1 and 3 encoded at 15 fps may be stored in memory 2. The video reconfiguration unit 1330 may be configured to reconfigure tile group 1 stored in memory 2 into a tile group having a frame rate of 30 fps through interpolation using collocated tile groups temporally adjacent to tile group 1. Similarly, tile group 3 may be reconfigured into a tile group having a frame rate of 30 fps. Thereafter, the video reconfiguration unit may combine tile groups 1 to 3 to output a video at a frame rate of 30 fps.

Referring to FIG. 15B, which illustrates spatial scalability, tile groups may be encoded and decoded at different spatial resolutions. Tile group 2 may be decoded at a first resolution and stored in memory 1, and tile groups 1 and 3 may be decoded at a resolution equal to half of the first resolution and stored in memory 2. The video reconfiguration unit 1330 may be configured to reconfigure tile groups stored in the memory 2 into tile groups having a first resolution through interpolation between pixels. Thereafter, tile groups 1 to 3 having the same resolution may be combined to output a video having the first resolution.

Furthermore, MCTs do not allow reference between tile groups at different positions. Therefore, only inter-prediction referring to a collocated tile group in a reference picture is allowed for a target block to be encoded or decoded in MCTs. Proposed in the present disclosure is a processing method used when a reference block indicated by a motion vector of the target block in MCTs is out of a collocated tile group in a reference picture.

In an embodiment, when at least a part of a reference block indicated by the motion vector of the target block in MCTs is out of a collocated tile group, pixels or samples in the outside region may be padded with one or more samples inside the collocated tile. For example, they may be padded with sample values adjacent to a boundary inside the tile group.

Alternatively, they may be padded with a predefined value such as 128. The predefined value may be derived from the bit depth of a sample as described above. Using a predefined padding value as a prediction value may be easily implemented through the above-described memory management method. For example, as described above, a plurality of tile groups constituting one picture may be stored with a spacing of multiple samples placed between tile groups. A predefined value such as 128 is stored in the storage space between the tile groups. Accordingly, when at least a part of the reference block indicated by the motion vector of the target block in MCTs is outside the collocated tile group, the sample values in the outside region are automatically set to 128.

In another embodiment, when at least a part of the reference block indicated by the motion vector of the target block in MCTs is outside the region of the collocated tile group, the motion vector of the target block may be adjusted such that the reference block is fully positioned within the collocated tile group. For example, the motion vector of the target block may be scaled such that the reference block is positioned inside the collocated tile group.

It should be understood that the exemplary embodiments described above may be implemented in many different ways. The functions described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding apparatus for decoding a sequence of pictures using gradual refresh, comprising:

one or more processors configured to decode a bitstream to reconstruct pictures in the sequence; and one or more memories configured to store the reconstructed pictures, wherein the one or more processors are configured to:

decode, from a header of the sequence, a flag indicating whether the gradual refresh is allowed, decode identification information for identifying a first picture to which the gradual refresh has been applied in the sequence, and determine a picture order count (POC) value of the first picture, decode group size information for identifying a group of pictures associated with the first picture to which the gradual refresh has been applied, determine a POC value of a second picture corresponding to a last picture belonging to the group based on the group size information and the POC value of the first picture, and determine the group of pictures associated with the first picture using the POC value of the first picture and the POC value of the second picture, wherein, whether to display decoded pictures is determined based on POC values of the decoded pictures such that pictures having a POC value greater than or equal to the POC value of the first picture and less than the POC value of the second picture are not allowed to be displayed after being decoded, wherein, the identification information indicates that the gradual refresh is not applied to the first picture in the sequence based on the flag indicating that the gradual refresh is not allowed, wherein, the identification information is decoded from a header of the first picture, wherein, when the identification information indicates that the first picture is to be subjected to the gradual refresh, the group size information is decoded from the header of the first picture, wherein, when a block in a picture belonging to the group is inter-predicted, prediction using a reference block padded with a predefined value is allowed for the block, wherein, the predefined value is derived from a bit depth of pixel values, wherein, the predefined value is equal to ½ of a maximum value expressed by the bit depth of the pixel values.

2. The apparatus of claim 1, wherein each of the pictures belonging to the group of pictures associated with the first picture includes refresh regions at different positions, the refresh regions being gradually decoded as the respective pictures belonging to the group are decoded, and wherein all the decoded refresh regions in the group of pictures associated with the first picture are combined to form a reference picture that is available for reference by another picture.

3. The apparatus of claim 2, wherein only intra-prediction decoding is allowed for the refresh regions.

4. The apparatus of claim 2, wherein both intra-prediction decoding and inter-prediction decoding are allowed for non-refresh regions in each of the pictures belonging to the group of pictures associated with the first picture.

5. The apparatus of claim 2, the one or more processors are further configured to:

decode position information indicating positions of the refresh regions in each of the pictures belonging to the group of pictures associated with the first picture.

6. The apparatus of claim 5, wherein, when the refresh regions of the pictures overlap each other, the one or more processors are further configured to:

filter the overlapping regions.

7. The apparatus of claim 6, the one or more processors are further configured to:

decode filter coefficient information for filtering the overlapping regions.

8. The apparatus of claim 2, wherein, when the reference picture combining the decoded refresh regions is used for inter-prediction of a target block to be decoded in said another picture, the target block is predicted using the reference picture after the boundary between the decoded refresh regions is filtered.

9. An encoding apparatus, comprising:

one or more processors configured to:

encode, into a header of the sequence in a bitstream, a flag indicating that the gradual refresh is allowed;

encode identification information for identifying a first picture to which the gradual refresh is applied in the sequence, and information on a picture order count (POC) value of the first picture;

determine a group of pictures associated with the first picture to which the gradual refresh is applied, and encoding group size information for identifying the group of pictures, wherein the group size information and the POC value of the first picture are used as information for deriving a POC value of a second picture corresponding to a last picture belonging to the group;

wherein, pictures having a POC value greater than or equal to the POC value of the first picture and less than the POC value of the second picture are not allowed to be displayed after being decoded, wherein, the identification information indicates that the gradual refresh is not applied to the first picture in the sequence based on the flag indicating that the gradual refresh is not allowed, wherein, the identification information is encoded in a header of the first picture, wherein, when the identification information indicates that the first picture is to be subjected to the gradual refresh, the group size information is encoded in the header of the first picture, wherein, when a block in a picture belonging to the group is inter-predicted, prediction using a reference block padded with a predefined value is allowed for the block, wherein, the predefined value is derived from a bit depth of pixel values, wherein, the predefined value is equal to ½ of a maximum value expressed by the bit depth of the pixel values.

10. A method for transmitting a bitstream associated with video data, the method comprising:

generating the bitstream by encoding the video data; and transmitting the bitstream to a video decoding apparatus, wherein generating the bitstream comprises:

encoding, into a header of a sequence in the bitstream, a flag indicating that gradual refresh is allowed;

encoding identification information for identifying a first picture to which the gradual refresh is applied in the sequence, and information on a picture order count (POC) value of the first picture;

determining a group of pictures associated with the first picture to which the gradual refresh is applied, and encoding group size information for identifying the group of pictures, wherein the group size information and the POC value of the first picture are used as information for deriving a POC value of a second picture corresponding to a last picture belonging to the group;

wherein, pictures having a POC value greater than or equal to the POC value of the first picture and less than the POC value of the second picture are not allowed to be displayed after being decoded, wherein, the identification information indicates that the gradual refresh is not applied to the first picture in the sequence based on the flag indicating that the gradual refresh is not allowed, wherein, the identification information is encoded in a header of the first picture, wherein, when the identification information indicates that the first picture is to be subjected to the gradual refresh, the group size information is encoded in the header of the first picture, wherein, when a block in a picture belonging to the group is inter-predicted, prediction using a reference block padded with a predefined value is allowed for the block, wherein, the predefined value is derived from a bit depth of pixel values, wherein, the predefined value is equal to ½ of a maximum value expressed by the bit depth of the pixel values.

* * * * *